United States Patent [19]

Zeiser et al.

[11] Patent Number: 5,377,735
[45] Date of Patent: Jan. 3, 1995

[54] ANTI-SKID DEVICE FOR MOTOR VEHICLES

[75] Inventors: Peter Zeiser, Aalen-Wasseralfingen; Anton Wolf, Ellenberg, both of Germany

[73] Assignee: RUD-KettenfabrikRieger & Dietz GmbH u. Co., Unterkochen, Germany

[21] Appl. No.: 112,111

[22] Filed: Aug. 26, 1993

[30] Foreign Application Priority Data

Sep. 2, 1992 [DE] Germany .................. 4229677

[51] Int. Cl.⁶ .................................. B60C 27/02
[52] U.S. Cl. ................... 152/214; 152/208; 188/4 B; 280/757; 301/6.1
[58] Field of Search ............. 152/208, 214, 221, 222; 188/4 B; 180/16; 280/757; 301/6.1

[56] References Cited

U.S. PATENT DOCUMENTS

| | | | |
|---|---|---|---|
| 1,045,609 | 11/1912 | Putnam | 188/4 B |
| 1,150,148 | 8/1915 | Putnam | 152/208 |
| 2,241,923 | 5/1941 | Ridgway | 188/4 B |
| 2,277,036 | 3/1942 | Chaussee | 188/4 B |
| 2,283,948 | 5/1942 | Ridgway | 188/4 B |
| 2,442,322 | 5/1948 | Daley | 188/4 B |
| 2,543,876 | 3/1951 | Smith | 91/210 |
| 2,815,828 | 12/1957 | Schaefer | 188/4 B |
| 3,068,949 | 12/1962 | Sirois | 188/4 B |
| 4,299,310 | 11/1981 | Törnebäck | 152/208 X |
| 4,840,399 | 6/1989 | Rieger et al. | 152/222 X |

FOREIGN PATENT DOCUMENTS 467494 1/1993 European Pat. Off. .

Primary Examiner—Michael W. Ball
Assistant Examiner—Francis J. Lorin
Attorney, Agent, or Firm—Mark P. Stone

[57] ABSTRACT

In an anti-skid device for motor vehicles, having a plurality of chain strands (10) distributed over the periphery of a holder (4), which holder can be set into a rotational motion, the holder exhibits a hub (6) having a ring collar (11). The ring collar (11) is surrounded by the ring bar (ring web) (18) of a friction wheel (7). Two plates (14, 15) of a pair of clamping plates are pressed by screw connections (16) against the side faces of the ring collar (11) and of the ring bar. The lower plate (15) is provided with slots (18) through which the ends of end links (20) of the chain strands (10) protrude into chambers (19) disposed in the ring bar (8) of the friction wheel. The anchorage of the end 1 inks (20) in the chambers (19) is here served by bolts (21).

7 Claims, 1 Drawing Sheet

5,377,735

ANTI-SKID DEVICE FOR MOTOR VEHICLES

BACKGROUND OF THE INVENTION

The invention relates to an anti-skid device for motor vehicles, having a plurality of chain strands distributed over the periphery of a holder which holder can be set into a rotational motion by a vehicle wheel, the ends of which chain strands facing away from the holder can be flung under centrifugal force beneath the vehicle wheel driving the holder, the holder being provided with a hub for a friction wheel which is made from elastic material and can be forced against the flank of the vehicle wheel and with a connecting member, formed by an annular plate, for the chain strands.

In an anti-skid device of the above type known from U.S. Pat. No. 2 277 036, the friction wheel and the connecting member, disposed on its underside, for the chain strands are mounted between two flanges of the hub of the holder and the end links of the chain strands are hung or welded into holes distributed over the periphery of the connecting member.

The known device is distinguished by the fact that it consists of a comparatively small number of simple parts. If it is nevertheless less than fully satisfactory, then this is due to the fact, inter alia, that in the case of the said device the connection between the friction wheel and the connecting member for the chain strands leaves something to be desired, as does the nature of the fastening of the chain strands to the connecting member.

In another anti-skid device known from U.S. Pat. No. 2 543 876, the hub for the friction wheel consists of two deep-drawn plates which are connected to each other and to a bush by welding, the lower plate of which exhibits a first holding flange for the friction wheel, whereas a second holding flange for the friction wheel is formed by the outer rim of a further plate, which plate is connected via spacers and screw bolts to the hub. Welded onto the lower of the two hub-forming plates are pairs of bars which are oriented perpendicularly to the plane of rotation of the friction wheel and are provided with bores for bolts for fastening the endsided eyelets of springs via which the chain strands are connected to the holder.

The second known anti-skid device has a complicated construction and is just as unsatisfactory in terms of the nature of the fastening of the chain strands to the holder as in terms of the secure seating of the friction wheel.

SUMMARY OF THE INVENTION

The object of the invention is to provide an anti-skid device of the generic type under consideration, having a holder which consists of a small number of simple parts and is easy to fit and in which a satisfactory transportation of the connecting member for the chain strands is guaranteed by the friction wheel. This object is achieved according to the invention by the fact that the hub exhibits a first central ring bar and the friction wheel exhibits a second ring bar matched to the width of the said first 2 ring bar, that the plate forming the connecting member forms, together with a further annular plate disposed above the ring bars, a pair of clamping plates which can be pressed by screw connections against the side faces of the ring bars and that the ring bar of the friction wheel is provided with chambers which are open in the direction of the lower plate and in which ends of the end links of the chain strands, which ends are placed through slots, preceding the chambers, in the lower plate, can be anchored.

The anti-skid device according to the invention is distinguished, due to the configuration of its holder, by a particularly economical and simple construction. The plates can be produced as simple stamped metal parts.

BRIEF DESCRIPTION OF THE DRAWINGS

The invention is explained in greater detail with reference to the appended drawing, in which.

DISCUSSION OF THE BEST MODES FOR CARRYING OUT THE INVENTION

Figure 1:
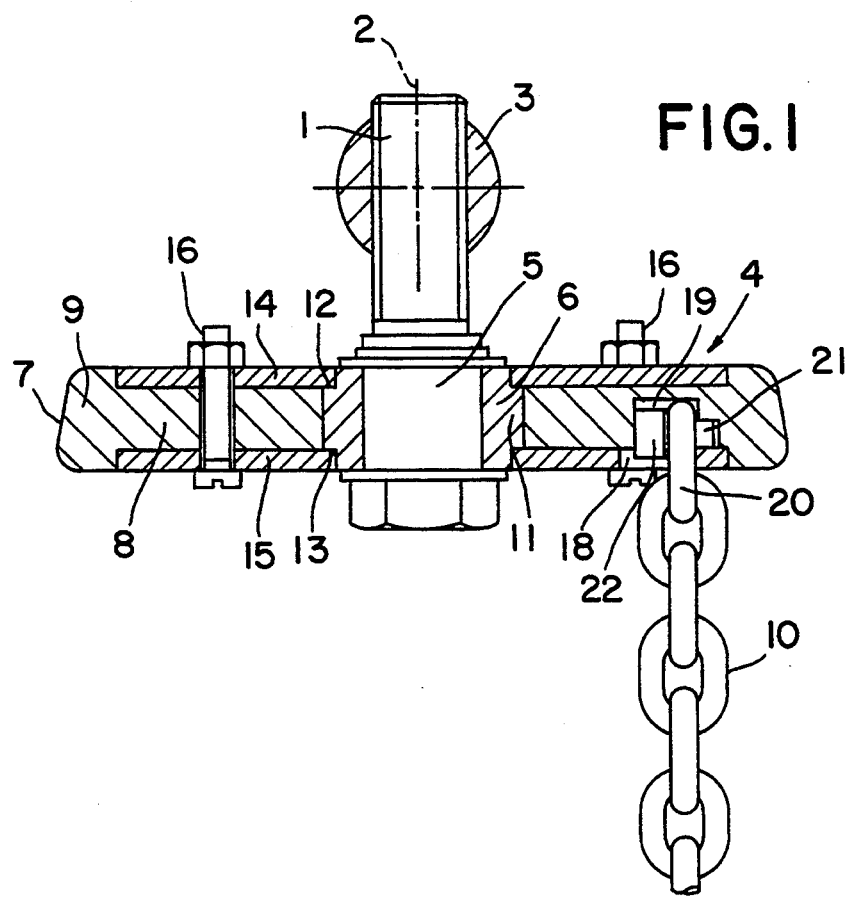
FIG. 1 show a section through a holder of an anti-skid device according to the invention according to the line I—I in FIG. 2.
Figure 2:
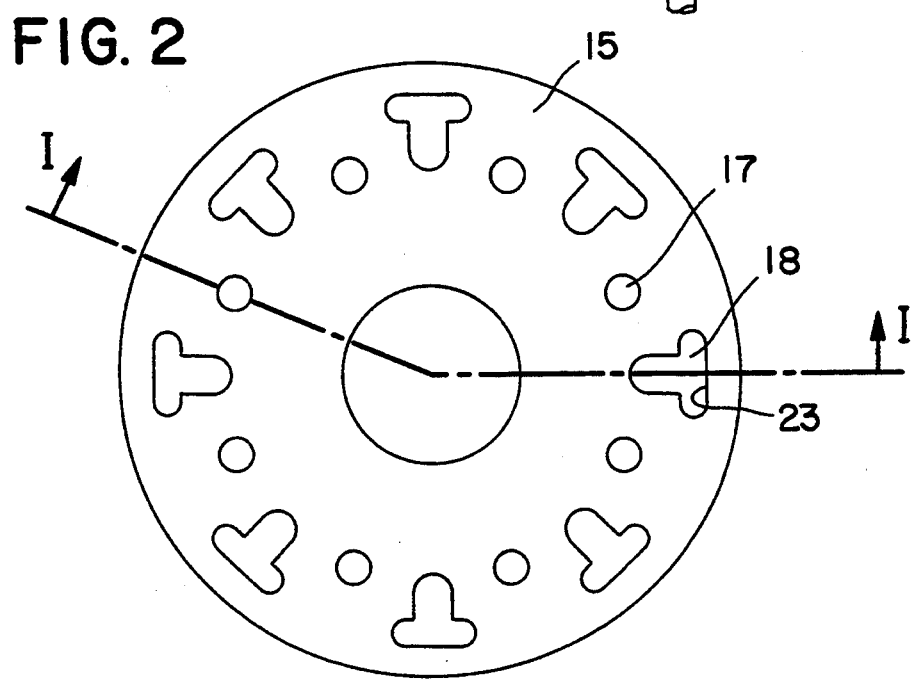
FIG. 2 shows the top view onto the lower of the two clamping plates of the holder according to FIG. 1
Figure 3:
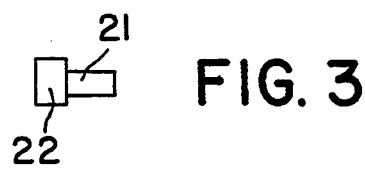
FIG. 3 shows a bolt for the anchorage of chain strands to the holder according to FIG. 1 or to the plate represented in FIG. 2.

In the drawing, 1 is a supporting bolt, which is adjustable in the direction of its longitudinal axis 2 and is mounted in a ball 3 of a ball joint (not represented), for a holder, universally denoted by 4, of an anti-skid device, as is increasingly used, especially for trucks. On the section 5 of the supporting bolt 1 there is rotatably mounted a hub 6 for a friction wheel 7, which hub is formed by a bearing bush. The friction wheel 7 exhibits a ring bar (ring web) 8 and a thereto adjoined contact cluster 9. The said friction wheel consists of elastic material and, to be precise, preferably of rubber. For the purpose of introducing a rotational motion into the holder 4, the friction wheel 7 is forced with its contact cluster 9 against the flank of that vehicle wheel beneath which the chain strands, which are respectively held by the holder 4 and are distributed over its periphery, are intended to be flung. For reasons of simplification, only one chain strand 10 of the eight chain strands provided for the holder 4 is represented in the drawing.

The hub 6 exhibits a central ring bar 11, against whose side faces 12 and 13 the inner rims of two annular plates 14 and 15 can be pressed by eight screw connections 16 distributed uniformly over the periphery of the holder 4. The flat plates 14 and 15, which can be easily produced by being stamped out of a sheet-metal plate, form a pair of clamping plates for the ring bar 8 of the friction wheel 7. The ring bar 8 has, in the clamped, i.e. fitted, state of the holder, the same width as the ring bar 11. Those parts of the contact cluster 9 of the friction wheel 7 projecting laterally over the ring bar 8 cover the outer rims of the plates 14 and 15.

The lower plate 15 is provided, between respectively successive bores 17 for the threaded bolts of the screw connections 16, with essentially T-shaped slots 18. The slots 18 are positioned in front of chambers 19 in the ring bar 8 of the friction wheel. Protruding into the chambers 19 are the arc-shaped ends of a respective end link 20 of a chain strand 10, the planes running through the longitudinal legs of the end link 20 being oriented in the peripheral direction of the holder 4.

The anchorage of the end links 20 of the chain strands 10 in the chambers 19 of the friction wheel 7 or on the lower plate 15 is served by bolts 21, which pass through the clear interior of the respective end link 20 and the longitudinal axes of which are directed radially outwards. Each bolt 21 exhibits, at its end facing the center of the holder 4, a stop flange 22, between which and the respective outer rim 23 of each individual slot 18 the end link 20 is positionally fixed. The stop flange 22 has a diameter which is greater than the width of the radial section of each individual slot 18, thereby resulting in a type of latch connection between the stop flanges 22 and the slots 18.

We claim:

1. An anti-skid device for motor vehicles, said device having a holder rotatable along an axis of rotation, said holder being operatively associated with a wheel of said motor vehicle for driving said holder into rotational motion; a plurality of chain strands forming anti-skid means being connected, at one end thereof, to said holder, the ends of each of each of said plurality of chain strands not connected to said holder being propelled beneath said vehicle wheel driving said holder into said rotational motion as a result of the effect of centrifugal force; said holder being provided with a hub for a friction wheel forming part of said anti-skid device, said friction wheel being made from an elastic material, said friction wheel having a circumference which can be forced against a flank of said vehicle wheel; and a first annular plate forming a connecting member for said plurality of chain strands; wherein said hub is provided with a first central ring bar, and said friction wheel is provided with a second ring bar; said first and second ring bars having substantially the same axial width; said first plate forming said connecting member being disposed beneath said first and second ring bars and forms, together with a second annular plate disposed above said first and second ring bars, a pair of clamping plates; said pair of clamping plates being pressed against side faces of said first and second ring bars by screw connections; said second ring bar provided on said friction wheel defining chambers opened in a direction towards said first plate; and means for anchoring ends of said end links of said chain strands connected to said holder, said ends of said end links being placed through slots defined in said first plate, said slots preceding said chambers defined in said second ring bar.

2. The anti-skid device as claimed in claim 1, wherein said circumference of said friction wheel is formed by a contact cluster adjoining said second ring bar, said contact cluster covering outer rims of said first and said second clamping plates.

3. The anti-skid device as claimed in claim 1, wherein said means for anchoring said end links of said plurality of said chain strands comprises a bolt passing through a clear interior space defined by each of said end links, said bolts being supported at their ends on said first clamping plate.

4. The anti-skid device as claimed in claim 3, wherein said bolts each define a longitudinal axis oriented in a direction radially outward from the center of said holder.

5. The anti-skid device as claimed in claim 1, wherein said slots preceding said chambers are configured in a T-shape in said first plate when said slots are viewed in a direction along said axis of rotation of said holder.

6. The anti-skid device as claimed in claim 5 wherein said means for anchoring comprises a bolt passing through a clear interior space defined by each of said end links of said plurality of chain strands connected to said holder; each of said bolts having two ends, one of said ends facing towards the center of said holder; said end of said bolt facing towards said center of said holder defining a stop flange for the end of one of said end links of one of said plurality of chain strands connected to said holder, said stop flange having a peripheral portion thereof received in a radially oriented section of said slot defined in said first clamping plate corresponding to a longitudinal portion of said T-shape thereof, said longitudinal portion extending in a direction radially outwardly from the center of said holder.

7. The anti-skid device as claimed in claim 1, wherein said first and said second plates forming said pair of clamping plates are each configured as stamped metal parts.

* * * * *